(No Model.)
F. M. WATERS & G. H. EARNEST.
Oscillating Gearing.
No. 234,354. Patented Nov. 9, 1880.
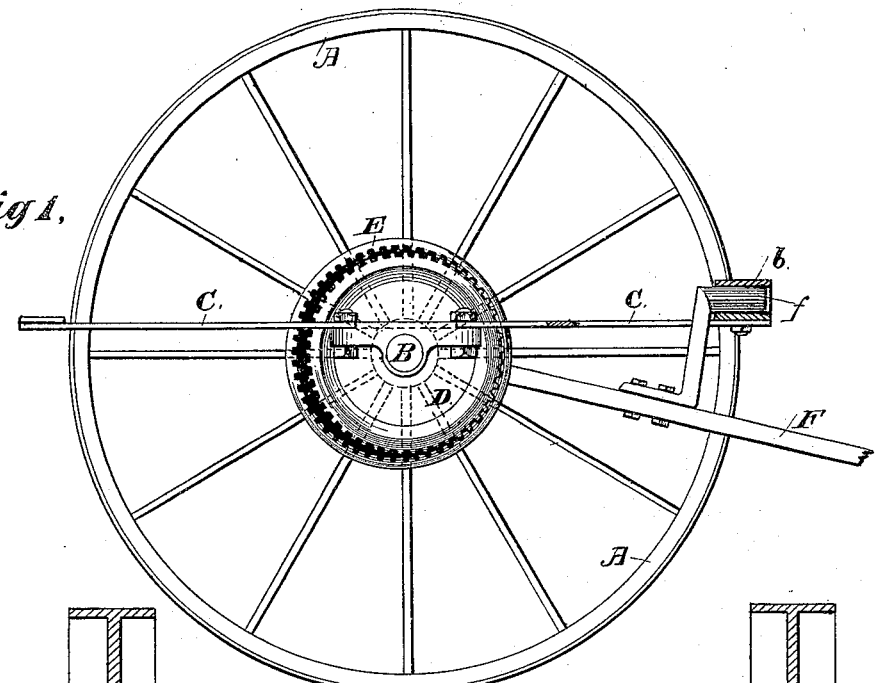
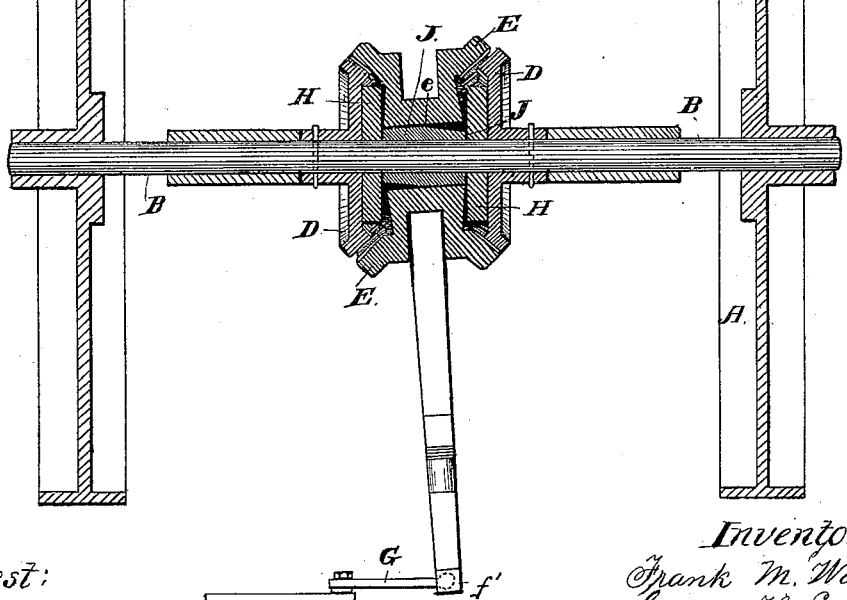
Attest:
Geo. T. Smallwood, Jr.
Walter Allen
Inventors:
Frank M. Waters
George H. Earnest
By Knight Bros, Attys

United States Patent Office.

FRANK M. WATERS AND GEORGE H. EARNEST, OF SPRINGFIELD, OHIO.

OSCILLATING GEARING.

SPECIFICATION forming part of Letters Patent No. 234,354, dated November 9, 1880.

Application filed July 23, 1880. (No model.)

*To all whom it may concern:*

Be it known that we, FRANK M. WATERS and GEORGE H. EARNEST, both citizens of the United States, residing at Springfield, in the county of Clarke and State of Ohio, have jointly invented Improvements in Oscillating Gearing, of which the following is a specification.

Our invention relates to a certain improvement upon the device shown in Patent No. 230,092, issued to us on the 13th day of July, 1880.

The present invention consists in forming the two-faced oscillator with a cylindrical instead of a double-flaring bore, the conical bearing being secured by a fusiform hub or collar upon that part of the ground-wheel shaft which traverses and supports the oscillator.

In the accompanying drawings, Figure 1 is a side elevation of a portion of a mowing-machine embodying our improvement. Fig. 2 is a horizontal section of the same in the plane of the ground-wheel shaft.

A A are the ground-wheels of a mowing-machine, and B is the ground-wheel shaft or axle, to which said wheels are either attached rigidly or by customary pawl and ratchet. C represents a portion of the mower-frame.

D D are two bevel-wheels that are fixed, facing each other, to the shaft B, and revolve with it. Between these two bevel-wheels is our double-faced oscillator E, engaging at diagonally-opposite points with said bevel-wheels and having imparted to it by them a wabbling motion, as set forth in the patent above referred to.

An arm, F, rigidly attached to the oscillator, and having a stud or wrist, *f*, that is restricted to a vibratory movement at or near the plane of the shaft B by a slotted yoke, *b*, upon the frame, serves to prevent rotation of the oscillator. The arm F is prolonged beyond the yoke *b*, and is coupled at *f* to the driving rod or pitman G of the sickle.

H H are washers, similar to those described in our said patent, for limiting the depth of mesh between the bevel-wheels and the oscillator.

Instead of forming the oscillator with a doubly-flaring bore, as in our former patent, we now prefer to form it with a cylindrical bore, *e*, and to support it upon a fusiform or doubly conical hub or collar, J, forming a part of or sleeved upon the ground-wheel shaft, which hub, fitting said bore at the hub's central cross-section, is tapered endwise therefrom in correspondence to the desired angle of gyration of the oscillator.

The hub J may revolve freely upon the shaft B, or it may be secured rigidly to it, or said hub and shaft may consist of a single integral piece of metal, as either of these forms would embody the principle of our present invention.

Our present improvement—and especially that form of it in which the hub consists of a loose and removable sleeve—has, relatively to that of our former patent, the advantages of cheaper manufacture, greater endurance, greater facilities for replacement and renewal of wearing parts, and for constructing them of steel or other hard metal. For example, the hub J may be formed wholly of steel, or of iron with a case-hardened or a chilled surface, and the walls of the cylindrical bore *e* may be of steel or other hard metal.

While preferring to guide the vibrations of the arm by a slotted yoke, as described, any suitable mechanical expedient may be employed for this purpose.

We claim as new and of our invention—

1. In combination with the gears D D, rigidly attached to the drive-shaft B, the double-faced cylindrically-bored non-rotating oscillator E, rocking upon a fusiform hub or collar, J, upon said shaft, substantially as set forth.

2. In combination with the oscillator E, the removable fusiform hub or sleeve J upon the shaft of the drive-gears, substantially as set forth.

3. A mowing-machine oscillating gearing composed of the following elements, to wit: a ground-wheel shaft, B, rigidly-attached drive-gears D D, cylindrically-bored and double-faced oscillator E, having the rigidly projecting sickle-driving arm F occupying yoke *b*, said oscillator resting and rocking upon fusiform hub or collar J upon said shaft, substantially as set forth.

FRANK M. WATERS.
GEO. H. EARNEST.

Attest:
GEO. H. KNIGHT,
J. J. SMITH.